United States Patent
Fukuda et al.

(10) Patent No.: US 10,366,830 B2
(45) Date of Patent: Jul. 30, 2019

(54) SURFACE MOUNT ELECTRONIC COMPONENT

(71) Applicant: Murata Manufacturing Co., Ltd., Nagaokakyo-shi, Kyoto-fu (JP)

(72) Inventors: Masaki Fukuda, Nagaokakyo (JP); Yuji Fukada, Nagaokakyo (JP); Jinya Furui, Nagaokakyo (JP); Takashi Inoue, Nagaokakyo (JP); Takashi Yamamoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/904,804

(22) Filed: Feb. 26, 2018

(65) Prior Publication Data

US 2018/0247766 A1 Aug. 30, 2018

(30) Foreign Application Priority Data

Feb. 27, 2017 (JP) .................................. 2017-035473

(51) Int. Cl.
*H01G 4/228* (2006.01)
*H01G 2/06* (2006.01)
*H01G 4/12* (2006.01)
*H01C 1/142* (2006.01)
*H01C 1/144* (2006.01)
(Continued)

(52) U.S. Cl.
CPC ............. *H01G 2/065* (2013.01); *H01C 1/142* (2013.01); *H01C 1/144* (2013.01); *H01C 7/003* (2013.01); *H01C 7/008* (2013.01); *H01C 17/283* (2013.01); *H01G 4/008* (2013.01); *H01G 4/1218* (2013.01); *H01G 4/1227* (2013.01); *H01G 4/1272* (2013.01); *H01G 4/224* (2013.01); *H01G 4/228* (2013.01); *H01G 4/236* (2013.01); *H01G 4/248* (2013.01); *H01G 4/01* (2013.01)

(58) Field of Classification Search
CPC ............................... H01G 4/228; H01G 2/065
See application file for complete search history.

(56) References Cited

U.S. PATENT DOCUMENTS 4,497,012 A * 1/1985 Gottlieb ................... H01G 2/06
29/25.42
4,933,811 A * 6/1990 Dorlanne ............. H01C 17/006
361/540
(Continued)

FOREIGN PATENT DOCUMENTS

DE 3638342 A1 * 5/1988 ........... H01C 1/1406
JP 59-210632 A 11/1984
(Continued)

*Primary Examiner* — Eric W Thomas
(74) *Attorney, Agent, or Firm* — Keating & Bennett,LLP

(57) ABSTRACT

A surface mount electronic component includes an element including a dielectric layer that includes a first main surface and a second main surface, a first external electrode disposed on the first main surface, a second external electrode disposed on the second main surface, a first metal terminal connected to the first external electrode, a second metal terminal connected to the second external electrode, and an exterior material covering at least a portion of the element, the first and second external electrodes, and the first and second metal terminals. Upper and lower surfaces of the exterior material are flat or substantially flat.

20 Claims, 9 Drawing Sheets

(51) Int. Cl.
*H01C 7/00* (2006.01)
*H01C 17/28* (2006.01)
*H01G 4/008* (2006.01)
*H01G 4/224* (2006.01)
*H01G 4/236* (2006.01)
*H01G 4/248* (2006.01)
*H01G 4/01* (2006.01)

(56) References Cited

U.S. PATENT DOCUMENTS

| | | | | |
|---|---|---|---|---|
| 4,959,505 | A * | 9/1990 | Ott | H01C 17/006 |
| | | | | 174/536 |
| 5,420,745 | A * | 5/1995 | Hidaka | H01G 4/228 |
| | | | | 361/301.3 |
| 6,316,726 | B1 * | 11/2001 | Hidaka | H01G 4/228 |
| | | | | 174/538 |
| 7,164,341 | B2 * | 1/2007 | Katsuki | H01C 1/1406 |
| | | | | 338/22 R |
| 2001/0006450 | A1 * | 7/2001 | Kobayashi | H01G 4/105 |
| | | | | 361/306.3 |
| 2002/0119366 | A1 * | 8/2002 | Tomitsuka | H01G 2/065 |
| | | | | 429/122 |
| 2003/0037962 | A1 * | 2/2003 | Kayatani | H01C 1/144 |
| | | | | 174/261 |
| 2018/0047507 | A1 * | 2/2018 | Koini | H01G 4/38 |

FOREIGN PATENT DOCUMENTS

| | | | | |
|---|---|---|---|---|
| JP | 2007-081250 A | | 3/2007 | |
| JP | 2011-009431 A | | 1/2011 | |
| JP | 5442793 B2 * | | 3/2014 | H01M 2/1055 |
| WO | WO-2005120143 A1 * | | 12/2005 | H01G 2/065 |

* cited by examiner

D: Diameter of element (mm)
S: Cross-sectional area of bonding material (mm²)

$$D\,(\text{mm}) \times 0.003\,(\text{mm}) \leq S\,(\text{mm}^2) \leq D\,(\text{mm}) \times 0.02\,\text{mm}$$

SURFACE MOUNT ELECTRONIC COMPONENT

CROSS REFERENCE TO RELATED APPLICATIONS

This application claims the benefit of priority to Japanese Patent Application No. 2017-035473 filed on Feb. 27, 2017. The entire contents of this application are hereby incorporated herein by reference.

BACKGROUND OF THE INVENTION

1. Field of the Invention

The present invention relates to a surface mount electronic component.

2. Description of the Related Art

For example, as an electronic component including an electronic component main body that is molded with a resin, the electronic components described in Japanese Patent Application Laid-Open Nos. S59-210632, 2011-9431, and 2007-81250 have been disclosed.

Japanese Patent Application Laid-Open No. S59-210632 discloses an electronic component which is connected to an electrode portion including a flat plate-shaped element having two electrode surfaces by soldering or the like and in which a protective coating material is coated thereon.

Further, Japanese Patent Application Laid-Open No. 2011-9431 discloses an electronic component in which lead-shaped metal terminals are connected to both sides of an electronic component element, a covering member covering the electronic component element is provided, and the lowest point of a mounting portion of the metal terminal and the lowest point of the covering member are arranged substantially in the same plane.

Furthermore, Japanese Patent Application Laid-Open No. 2007-81250 discloses a radial lead type electronic component including an element portion coated with an insulating resin and two lead portions connected to the element portion and a surface mount electronic component including a case internally accommodating the radial lead type electronic component.

However, in an electronic component as disclosed in Japanese Patent Application Laid-Open No. S59-210632, when electronic components are mounted, they are mounted by flow mounting or welding with lead wires inserted into a mounting substrate.

Accordingly, the electronic component cannot be mounted by reflow mounting in the first place.

Further, in an electronic component as disclosed in Japanese Patent Application Laid-Open No. 2011-9431, although surface mounting is possible, the flatness of a surface coated with a protective coating material is not sufficient. Thus, suction failure of a mounter of a mounting machine used to mount an electronic component on a mounting substrate occurs, the electronic component cannot be mounted on the mounting substrate, and mounting failure may occur.

Furthermore, although Japanese Patent Application Laid-Open No. 2007-81250 can solve the problem of Japanese Patent Application Laid-Open No. 2011-9431, the radial lead type electronic component is accommodated in the case, so that a problem occurs in which the height of a surface mount electronic component increases. Thus, in recent years, there are cases in which it is not possible to satisfy a requirement for miniaturization/height reduction of electronic components due to height reduction of electronic equipment. Further, since a process for accommodating electronic components in a case is required, the production cost increases.

SUMMARY OF THE INVENTION

Preferred embodiments of the present invention provide surface mount electronic components which allow reflow mounting to improve mountability and in which the height is reduced.

A surface mount electronic component according to a preferred embodiment of the present invention includes an element including a dielectric layer that includes a first main surface and a second main surface, a first external electrode disposed on the first main surface, a second external electrode disposed on the second main surface, a first metal terminal connected to the first external electrode, a second metal terminal connected to the second external electrode, and an exterior material covering at least a portion of the element, the first and second external electrodes, and the first and second metal terminals. In the surface mount electronic component, upper and lower surfaces of the exterior material are flat or substantially flat, and the first metal terminal includes a first bonding portion connected to the first external electrode, a first extending portion connected to the first bonding portion and extending in a direction parallel or substantially parallel to the first main surface with a space from the first main surface, a second extending portion connected to the first extending portion and extending towards the element, a third extending portion connected to the second extending portion and extending in the direction parallel or substantially parallel to the first main surface, a fourth extending portion connected to the third extending portion and extending in a mounting direction, and a first mounting portion connected to the fourth extending portion and mounted on a mounting substrate. The second metal terminal includes a second bonding portion connected to the second external electrode, a fifth extending portion connected to the second bonding portion and extending in a direction parallel or substantially parallel to the second main surface with a space from the second main surface, a sixth extending portion connected to the fifth extending portion and extending towards the element, a seventh extending portion connected to the sixth extending portion and extending in the direction parallel substantially parallel to the second main surface, an eighth extending portion connected to the seventh extending portion and extending in the mounting direction, and a second mounting portion connected to the eighth extending portion and mounted on the mounting substrate. In the first bonding portion, a distal end of the first bonding portion is disposed in a direction away from the first main surface from an intermediate portion of the first bonding portion toward the distal end, and the first bonding portion is in surface contact with the first external electrode at the intermediate portion located on an opposite side of the distal end. A first cut-out portion is provided in a portion in which the second extending portion and the third extending portion of the first metal terminal intersect with each other. The second bonding portion includes a bifurcated distal end and is in surface contact with the second external electrode at the bifurcated portion. A second cut-out portion is provided in the fifth extending portion of the second metal terminal. A third cut-out portion is provided in a portion in which the sixth extending portion and the seventh extending portion of the second metal terminal intersect with each other. The first to third cut-out portions are covered with the exterior material.

In a surface mount electronic component according to a preferred embodiment of the present invention, the first external electrode and the first metal terminal are connected by a bonding material, and the second external electrode and the second metal terminal are connected by the bonding material. The bonding material is preferably a lead-free solder having a high melting point.

In a surface mount electronic component according to a preferred embodiment of the present invention, the lead-free solder having a high melting point is preferably a Sn-10Sb to Sn-15Sb alloy solder (Here, numerals before atomic element mean the amount in weight percent (wt %), and the same applies hereafter).

In a surface mount electronic component according to a preferred embodiment of the present invention, it is preferable that the first external electrode and the second external electrode include a first electrode layer made of a Ni—Ti alloy and a second electrode layer made of Cu.

In a surface mount electronic component according to a preferred embodiment of the present invention, the exterior material is preferably made of a thermosetting epoxy resin.

In a surface mount electronic component according to a preferred embodiment of the present invention, it is preferable that the element has a disk shape, a diameter of an outer shape of this element is not less than about 3.4 mm and not more than about 5.0 mm, and a thickness of this element is t=not less than about 0.90 mm and not more than about 0.95 mm.

With a surface mount electronic component according to a preferred embodiment of the present invention, the element on which the first external electrode and the second external electrode are arranged is supported not by a lead wire but by the first metal terminal and the second metal terminal and is able to be mounted on the mounting substrate by the first metal terminal and the second metal terminal, and therefore, mounting by reflow is enabled.

With a surface mount electronic component according to a preferred embodiment of the present invention, the first metal terminal includes the first bonding portion connected to the first external electrode, the first extending portion connected to the first bonding portion and extending in the direction parallel or substantially parallel to the first main surface with a space from the first main surface, the second extending portion connected to the first extending portion and extending towards the element, the third extending portion connected to the second extending portion and extending in the direction parallel or substantially parallel to the first main surface, the fourth extending portion connected to the third extending portion and extending in the mounting direction, and the first mounting portion connected to the fourth extending portion and mounted on the mounting substrate. In addition, the second metal terminal includes the second bonding portion connected to the second external electrode, the fifth extending portion connected to the second bonding portion and extending in the direction parallel or substantially parallel to the second main surface with a space from the second main surface, the sixth extending portion connected to the fifth extending portion and extending towards the element, the seventh extending portion connected to the sixth extending portion and extending in the direction parallel or substantially parallel to the second main surface, the eighth extending portion connected to the seventh extending portion and extending in the mounting direction, and the second mounting portion connected to the eighth extending portion and mounted on the mounting substrate.

With the above-described configuration, a case member as disclosed in Japanese Patent Application Laid-Open No. 2007-81250 is not required, and the shape of the metal terminal is optimized, so that an increase in the height dimension of the surface mount electronic component is prevented, and the height of the surface mount electronic component is reduced.

With a surface mount electronic component according to a preferred embodiment of the present invention, since the upper and lower surfaces of the exterior material are flat or substantially flat, sufficient flatness is ensured. Thus, it is possible to prevent suction failure of a mounter of a mounting machine used to mount the surface mount electronic component on the mounting substrate, and to reliably mount the surface mount electronic component on the mounting substrate. As a result, the occurrence of mounting failure is prevented.

With a surface mount electronic component according to a preferred embodiment of the present invention, the first external electrode and the first metal terminal are bonded by the bonding material, and the second external electrode and the second metal terminal are bonded by the bonding material. When the bonding material is a lead-free solder having a high melting point, while bonding strength between the element and the metal terminal is ensured, heat resistance of the bonding portion to a flow or reflow temperature during mounting of the board is ensured.

With a surface mount electronic component according to a preferred embodiment of the present invention, when the lead-free solder is the Sn-10Sb to Sn-15Sb alloy solder, the heat resistance of the bonding portion during mounting is ensured.

With a surface mount electronic component according to a preferred embodiment of the present invention, when the first external electrode and the second external electrode include the first electrode layer made of a Ni—Ti alloy and the second electrode layer made of Cu, improved bonding strength between the element and the second electrode layer by the first electrode layer in the first external electrode and the second external electrode is provided, and improved electroconductivity and bonding strength between the second electrode layer and the bonding material by the second electrode layer is provided.

With a surface mount electronic component according to a preferred embodiment of the present invention, when the exterior material is made of a thermosetting epoxy resin, adhesion between the exterior material and the element or the metal terminal is ensured, and improved withstand voltage and moisture resistance performance are obtained.

With a surface mount electronic component according to a preferred embodiment of the present invention, the element has a disk shape, and when the diameter of the outer shape of the element is not less than about 3.4 mm and not more than about 5.0 mm, and the thickness of the element is t=not less than about 0.90 mm and not more than about 0.95 mm, since the shape of the element is optimized, the size and height of the surface mount electronic component is able to be reduced.

Preferred embodiments of the present invention provide surface mount electronic components which allow reflow mounting to improve mountability and enable a reduced height.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of surface mount electronic components according to the present invention will be described.

Figure 1:
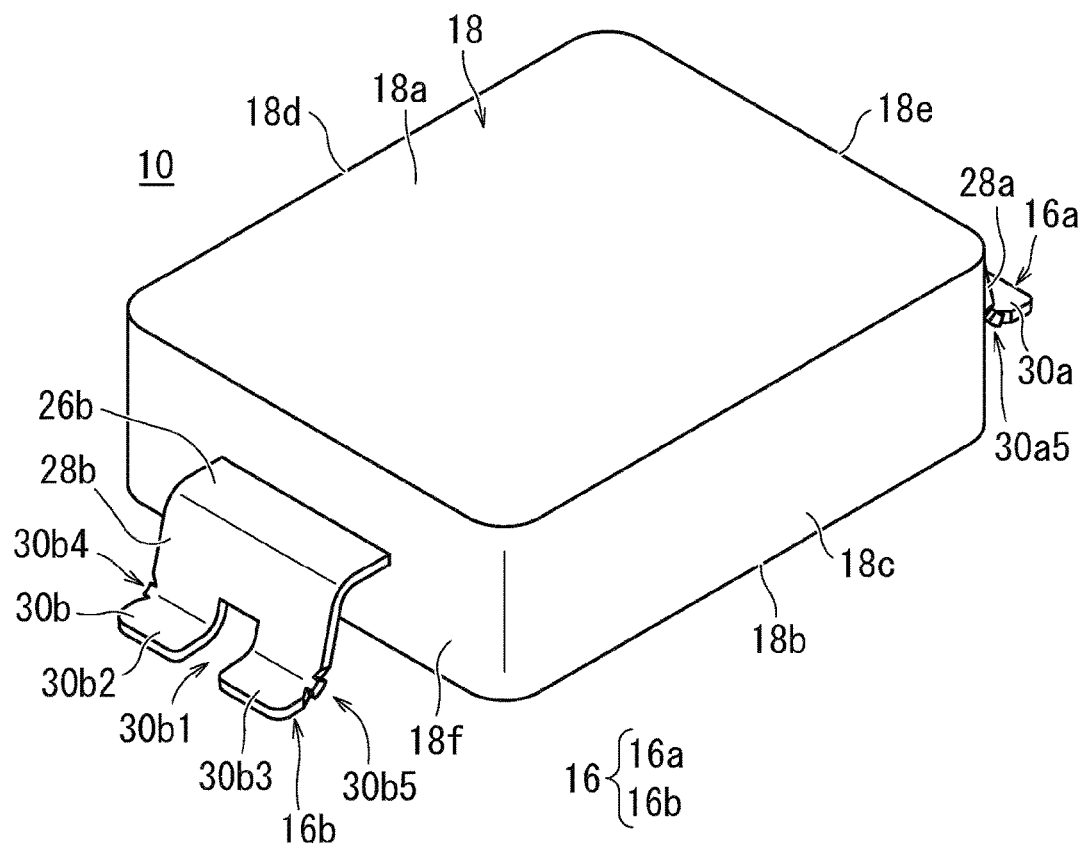
FIG. 1 is an external perspective view showing an example of a surface mount electronic component according to a preferred embodiment of the present invention.
Figure 2:
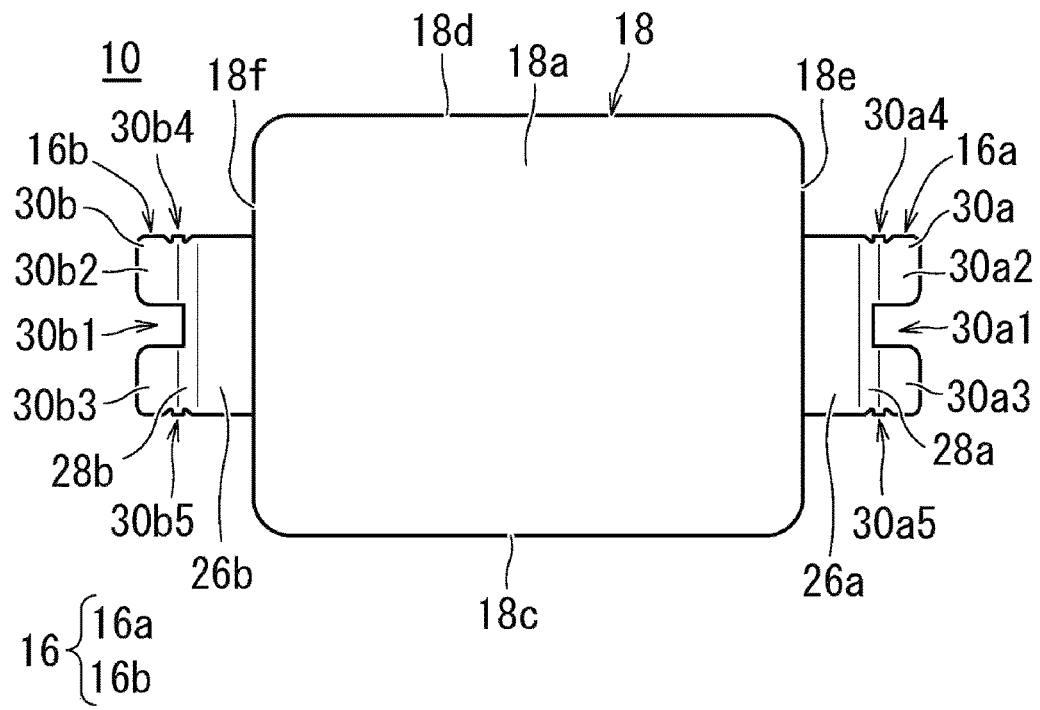
FIG. 2 is a top view of the surface mount electronic component shown in FIG. 1 showing a surface mount electronic component according to a preferred embodiment of the present invention.
Figure 3:
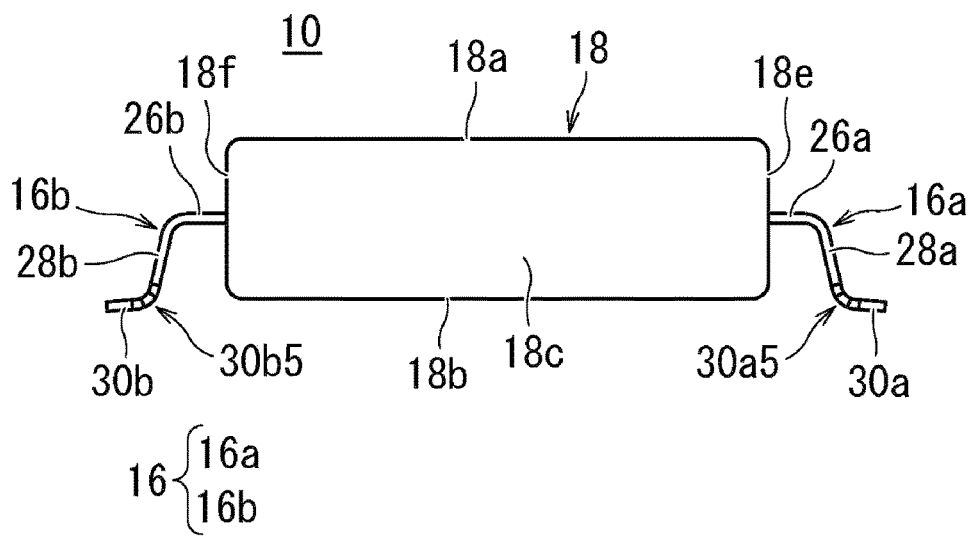
FIG. 3 is a side view of the surface mount electronic component shown in FIG. 1 showing a surface mount electronic component according to a preferred embodiment of the present invention.
Figure 4:
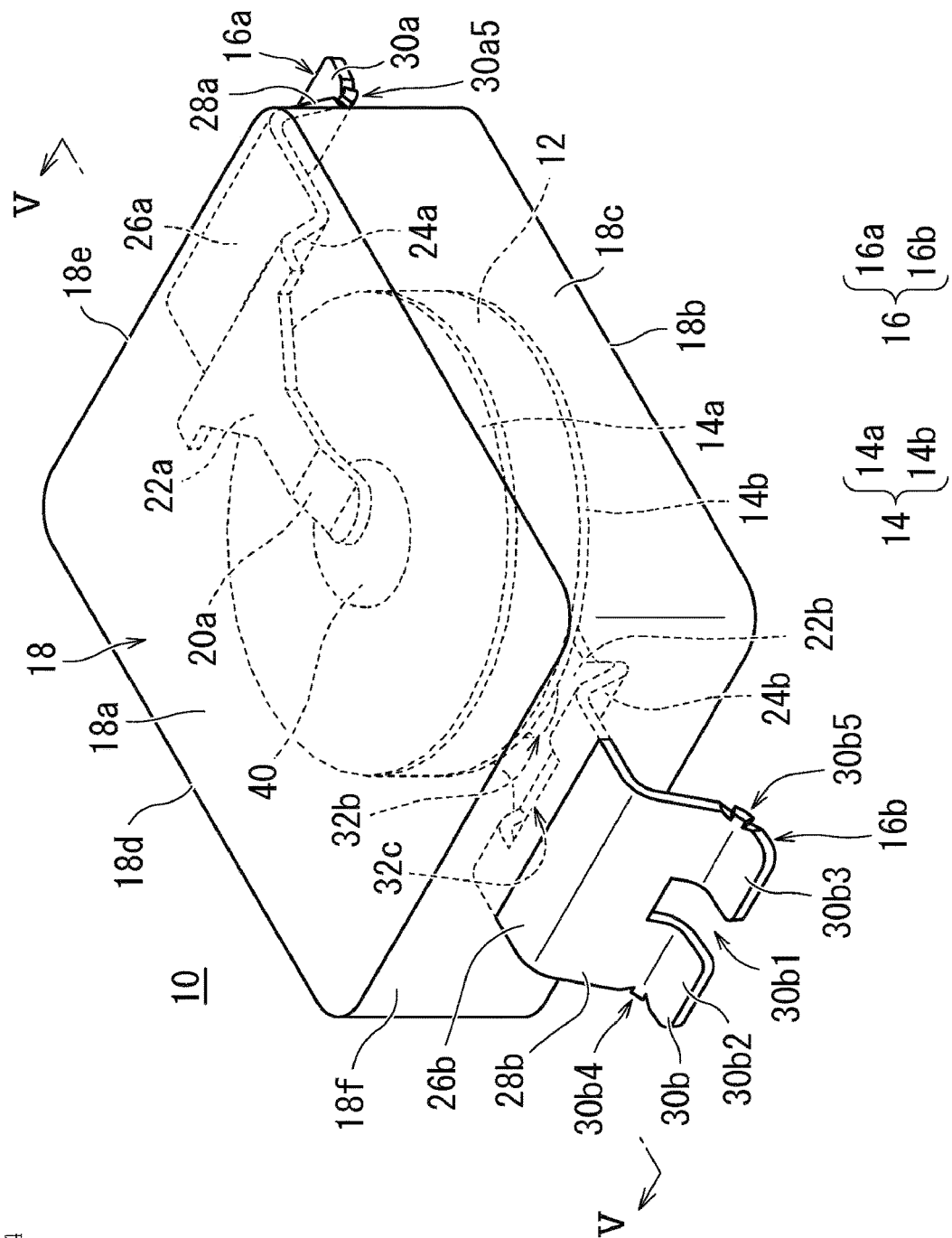
FIG. 4 is a perspective illustration view showing an internal structure of a surface mount electronic component according to a preferred embodiment of the present invention.
Figure 5:
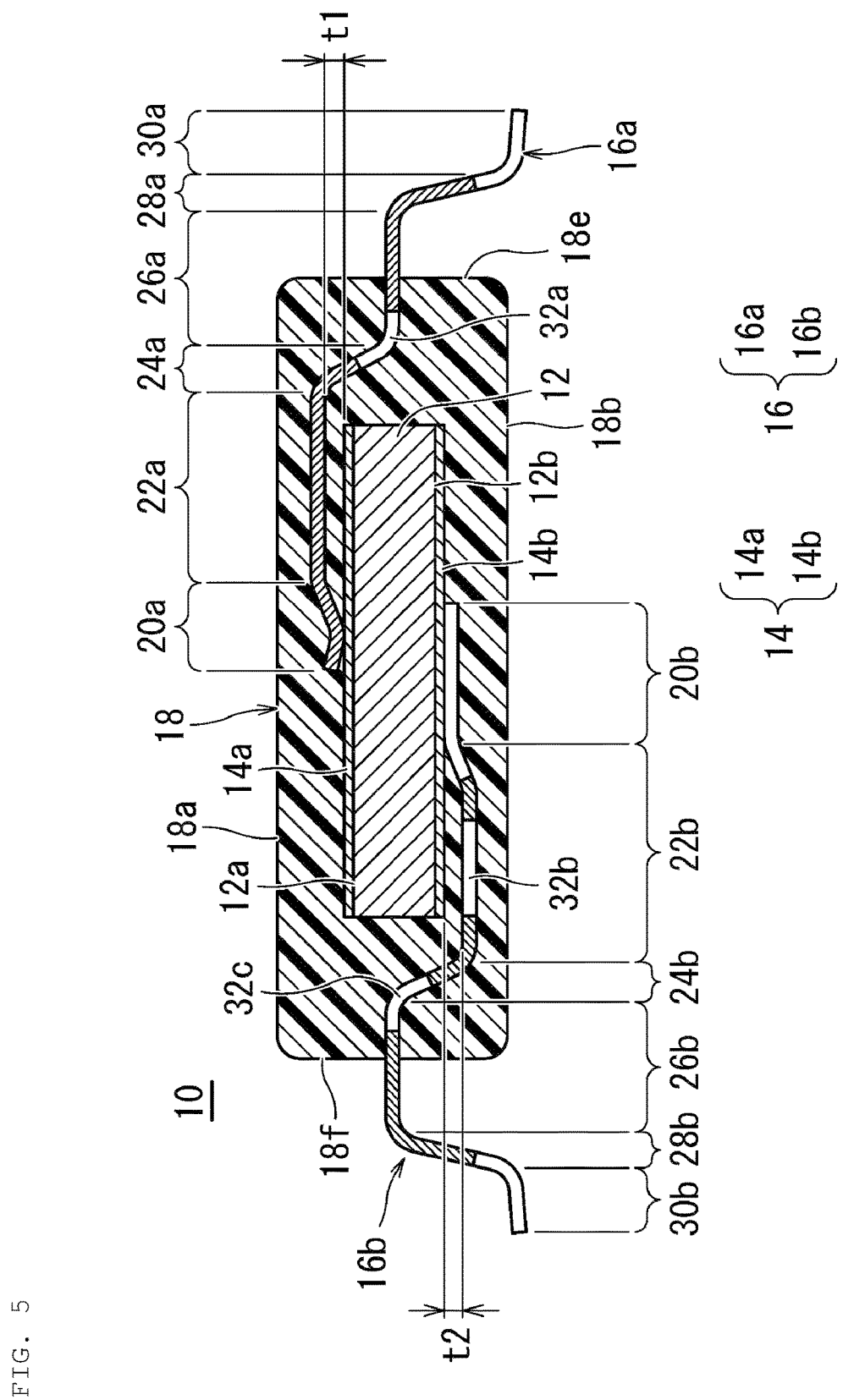
FIG. 5 is a cross-sectional view taken along line V-V in FIG. 4 showing a surface mount electronic component according to a preferred embodiment of the present invention.
Figure 6:
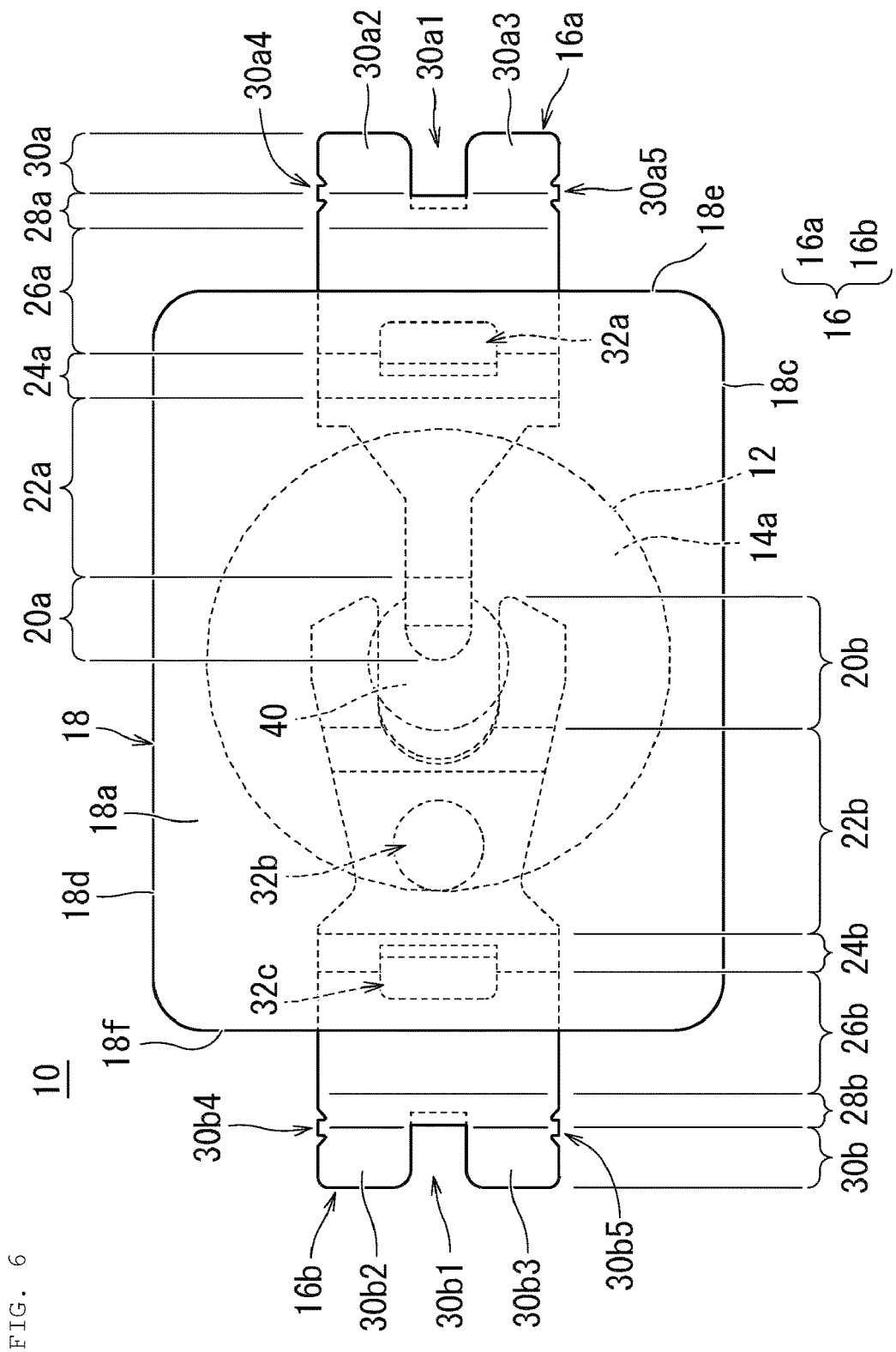
FIG. 6 is a top view of FIG. 4 showing a surface mount electronic component according to a preferred embodiment of the present invention.
Figure 7:
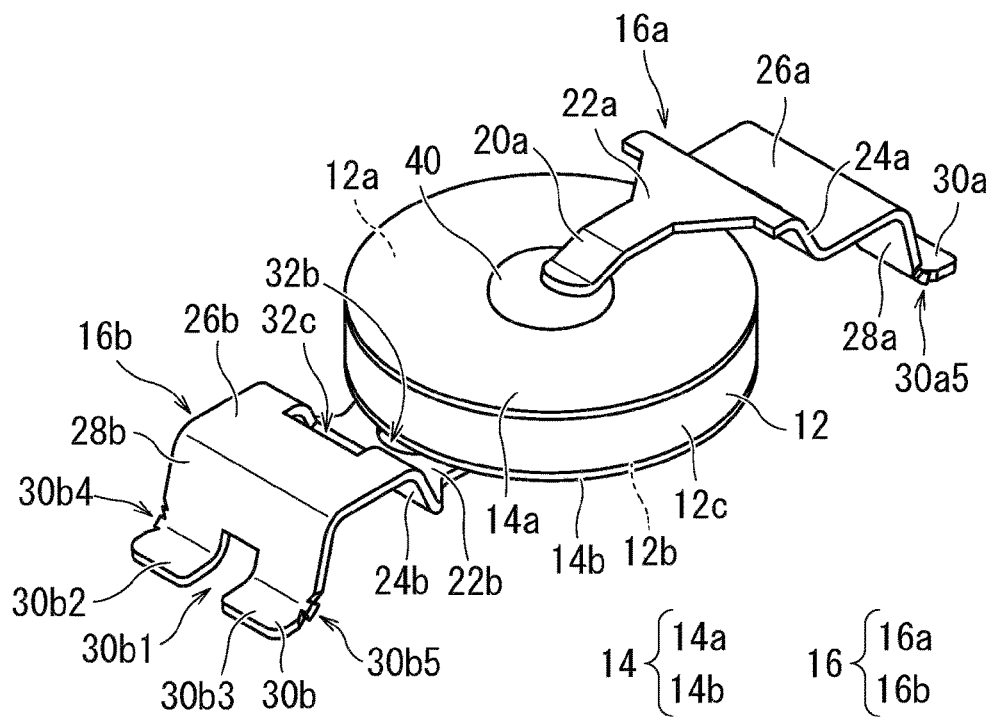
FIG. 7 is an external perspective view showing a state in which an exterior material is removed in a surface mount electronic component according to a preferred embodiment of the present invention.
Figure 8A:
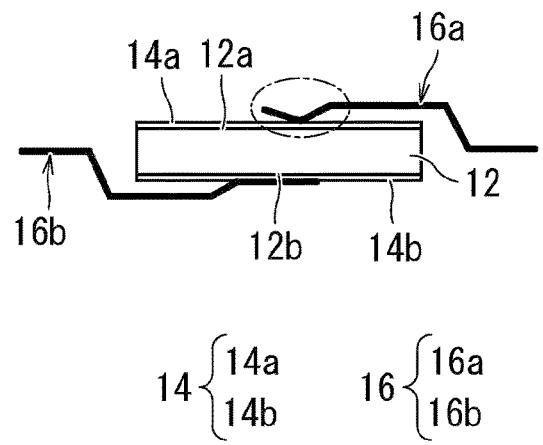
FIG. 8A is a side view of FIG. 7 showing the state in which the exterior material is removed in a surface mount electronic component according to a preferred embodiment of the present invention.
Figure 8B:
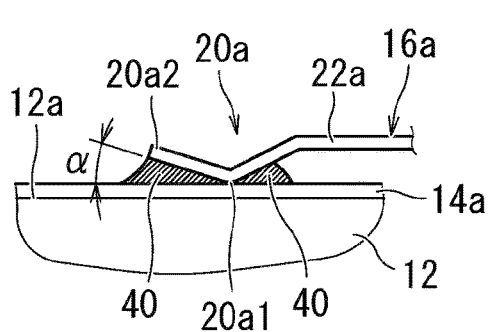
FIG. 8B is an enlarged view of a bonding portion between a first bonding portion and a first external electrode.

FIG. 1 is an external perspective view showing an example of a surface mount electronic component according to a preferred embodiment of this invention. FIG. 2 is a top view of the surface mount electronic component shown in FIG. 1 showing a surface mount electronic component according to a preferred embodiment of the present invention. FIG. 3 is a side view of the surface mount electronic component shown in FIG. 1 showing a surface mount electronic component according to a preferred embodiment of the present invention. FIG. 4 is a perspective illustration view showing an internal structure of a surface mount electronic component according to a preferred embodiment of the present invention. FIG. 5 is a cross-sectional view taken along line V-V in FIG. 4 showing a surface mount electronic component according to a preferred embodiment of the present invention. FIG. 6 is a top view of FIG. 4 showing a surface mount electronic component according to a preferred embodiment of the present invention. FIG. 7 is an external perspective view showing a state in which an exterior material is removed in a surface mount electronic component according to a preferred embodiment of the present invention. FIG. 8A is a side view of FIG. 7 showing the state in which the exterior material is removed in a surface mount electronic component according to a preferred embodiment of the present invention, and FIG. 8B is an enlarged view of a bonding portion between a first bonding portion and a first external electrode.

A surface mount electronic component 10 includes an element 12. The element 12 is preferably made of a single ceramic plate and has a disk shape, for example. The element 12 includes a first main surface 12a and a second main surface 12b facing each other and a side surface 12c connecting the first main surface 12a and the second main surface 12b.

The surface mount electronic component 10 further includes an external electrode 14 disposed on the first main surface 12a and the second main surface 12b of the element 12, a metal terminal 16 connected to the external electrode 14 with a bonding material 40 interposed therebetween, the element 12, and an exterior material 18 covering at least a portion of the external electrode 14 and the metal terminal 16.

As a material of the ceramic plate, for example, a dielectric ceramic primarily including $BaTiO_3$, $CaTiO_3$, $SrTiO_3$, $CaZrO_3$, or other suitable ceramic may preferably be used. Further, it is also possible to use those obtained by adding accessory components, such as a Mn compound, a Mg compound, a Si compound, a Co compound, and a Ni compound to these main components. In addition, piezoelectric ceramics, such as PZT-based ceramics, semiconductor ceramics, such as spinel type ceramics, and other suitable ceramics may also be used.

Since the element 12 includes a dielectric ceramic, the element 12 functions as a capacitor. On the other hand, the element 12 functions as a piezoelectric component when a piezoelectric ceramic is used, and functions as a thermistor when a semiconductor ceramic is used.

Although the outer diameter dimension of the element 12 is not particularly limited, the diameter of the element 12 is preferably not less than about 3.0 mm and not more than about 6.0 mm, and more preferably not less than about 3.4 mm and not more than about 5.0 mm, for example.

Although the thickness of the element 12 is not particularly limited, it is preferably not less than about 0.8 mm and not more than about 1.2 mm, and more preferably not less than about 0.9 mm and not more than about 0.95 mm, for example.

The external electrode 14 is disposed on the first main surface 12a and the second main surface 12b of the element 12.

The external electrode 14 includes a first external electrode 14a and a second external electrode 14b.

The first external electrode 14a is disposed on a surface of the first main surface 12a of the element 12. The second external electrode 14b is disposed on a surface of the second main surface 12b of the element 12.

Although the size of the first external electrode 14a is not particularly limited, it is preferable that the first external electrode 14a is disposed on the entire or substantially the entire first main surface 12a of the element 12. Similarly, although the size of the second external electrode 14b is not particularly limited, it is preferable that the second external electrode 14b is disposed on the entire or substantially the entire second main surface 12b of the element 12. This makes it possible to alleviate electric field concentration as compared to a case in which a gap electrode is disposed, and improved withstand voltage performance is obtained.

As the material of the external electrode 14, for example, a metal, such as Cu, Ni, Cr, Ag, Pd, Au, or Ti or an alloy including at least one of these metals, such as Ag—Pd alloy, Cu—Ni alloy, Cu—Ti alloy, Ni—Cr alloy, or Ni—Ti alloy, may preferably be used. The external electrode 14 may be made by laminating these metal materials.

In particular, the external electrode 14 preferably includes a first electrode layer (hereinafter referred to as Ni—Ti alloy layer) made of a Ni—Ti alloy and a second electrode layer (hereinafter referred to as Cu layer) disposed on a surface of the Ni—Ti alloy layer and made of Cu, for example.

In the external electrode 14, the Ni—Ti alloy layer and the Cu layer may be alternately provided in a plurality of layers.

For example, the external electrode 14 of the surface mount electronic component 10 may have a four-layer structure formed by alternately arranging the Ni—Ti alloy layers and the Cu layers. This makes it possible to obtain improved bonding strength between the element 12 and the Cu layer as the second layer in the Ni—Ti alloy layer as the first layer. In the Cu layer as the second layer disposed on a surface of the Ni—Ti alloy layer as the first layer, electroconductivity is ensured. In the Ni—Ti alloy layer as the third layer disposed on a surface of the Cu layer as the second layer, diffusion of the bonding material 40 and an oxide layer to an underlying electrode is reduced or prevented. In the Cu layer as the fourth layer disposed on a surface of the Ni—Ti alloy layer as the third layer, the bonding strength with the bonding material 40 is ensured.

The external electrode 14 is preferably formed by electroless plating, vacuum film formation, sputtering or other suitable method. Although the thickness of the external electrode 14 is not particularly limited, the thickness of the external electrode 14 is preferably not less than about 0.1 μm and not more than about 0.35 μm per layer, and the thickness of the entire external electrode 14 is preferably not less than about 0.7 μm and not more than about 1.2 μm, for example. Consequently, the thickness of the external electrode 14 is able to be reduced, and the height of the surface mount electronic component 10 is able to be reduced.

The metal terminal 16 is connected to the external electrode 14. The metal terminal 16 includes a first metal terminal 16a and a second metal terminal 16b.

The first metal terminal 16a is connected to the first external electrode 14a. On the other hand, the second metal terminal 16b is connected to the second external electrode 14b.

The metal terminal 16 is a frame-shaped metal terminal. Since the metal terminal 16 is made of a plate-shaped lead frame, the metal terminal 16 enables mounting on a mounting substrate, so that the surface mount electronic component 10 is able to be mounted by reflow.

The metal terminal 16 includes a terminal body and a plating film provided on a surface of the terminal body.

The terminal body is preferably made of Ni, Fe, Cu, Ag, Cr, or an alloy primarily including one or more of these metals, for example. Specifically, for example, the parent material of the terminal body is preferably Fe-18 Cr alloy, Fe-42 Ni alloy, or Cu-8 Sn alloy (Here, numerals before the atomic elements indicate the amount in weight percent (wt %), and applies hereafter). The thickness of the terminal body of the metal terminal 16 is preferably not less than about 0.05 mm and not more than about 0.5 mm, for example.

The plating film includes a lower layer plating film and an upper layer plating film. The lower layer plating film is provided on the surface of the terminal body, and the upper layer plating film is provided on a surface of the lower layer plating film. Each of the lower layer plating film and the upper layer plating film may include a plurality of plating films.

The lower layer plating film may be made of, for example, Ni, Fe, Cu, Ag, Cr, or an alloy primarily including one or more of these metals. The lower layer plating film is preferably made of Ni, Fe, Cr, or an alloy primarily including one or more of these metals, for example.

The upper layer plating film may be made of, for example, Sn, Ag, Au, or an alloy primarily including one or more of these metals. The upper layer plating film is preferably made of Sn or an alloy primarily made of Sn, for example. When the upper layer plating film is made of Sn or an alloy primarily including Sn, solderability between the metal terminal 16 and the external electrode 14 is improved.

The thickness of the lower layer plating film is preferably not less than about 0.2 μm and not more than about 5.0 μm, for example. The thickness of the upper layer plating film is preferably not less than about 1.0 μm and not more than about 5.0 μm, for example.

When each of the terminal body and the lower layer plating film is made of Ni, Fe or Cr having a high melting point, or an alloy primarily including one or more of these metals, heat resistance of the external electrode 14 is improved.

The first metal terminal 16a includes a first bonding portion 20a connected to the first external electrode 14a, a first extending portion 22a connected to the first bonding portion 20a and extending in a direction parallel or substantially parallel to the first main surface 12a with a space t1 from the first main surface 12a, a second extending portion 24a connected to the first extending portion 22a and extending towards the element 12, a third extending portion 26a connected to the second extending portion 24a and extending again in the direction parallel or substantially parallel to the first main surface 12a, a fourth extending portion 28a connected to the third extending portion 26a and extending in a mounting direction, and a first mounting portion 30a connected to the fourth extending portion 28a and mounted on the mounting substrate.

The second metal terminal 16b includes a second bonding portion 20b connected to the second external electrode 14b, a fifth extending portion 22b connected to the second bonding portion 20b and extending in a direction parallel or substantially parallel to the second main surface 12b with a space t2 from the second main surface 12b, a sixth extending portion 24b connected to the fifth extending portion 22b and extending towards the element 12, a seventh extending portion 26b connected to the sixth extending portion 24b and extending again in the direction parallel or substantially parallel to the second main surface 12b, an eighth extending portion 28b connected to the seventh extending portion 26b and extending in the mounting direction, and a second mounting portion 30b connected to the eighth extending portion 28b and mounted on the mounting substrate.

The first bonding portion 20a of the first metal terminal 16a is a portion connected to the first external electrode 14a disposed on the surface of the first main surface 12a of the element 12. In the first bonding portion 20a of the first metal terminal 16a, as shown in FIGS. 8A and 8B, a distal end 20a2 of the first bonding portion 20a is disposed in a direction away from the first main surface 12a from an intermediate portion 20a1 of the first bonding portion 20a towards the distal end 20a2. The intermediate portion 20a1 (that is, a portion located on the opposite side of the distal end of the first bonding portion 20a) of the first bonding portion 20a is in surface contact with the first external electrode 14a. Consequently, a capacity in which the bonding material 40 is provided between the first bonding portion 20a and the first external electrode 14a is increased. Therefore, the bonding material 40 is sufficiently disposed between the upper surface of the first external electrode 14a and the first bonding portion 20a of the first metal terminal 16a, and the bonding strength is increased.

Although the distal end of the first bonding portion 20a is disposed in a direction away from the first main surface 12a from the intermediate portion of the first bonding portion 20a toward the distal end, an angle α between a direction connecting the intermediate portion of the first bonding portion 20a and the distal end and the upper surface of the first external electrode 14a is preferably an angle of not less than about 1° and not more than about 5°, for example. Within this range, the bonding strength between the first external electrode 14a and the first metal terminal 16a is ensured.

The width of the first bonding portion 20a of the first metal terminal 16a is preferably not less than about 0.5 mm and not more than about 0.9 mm, for example.

Figure 9:
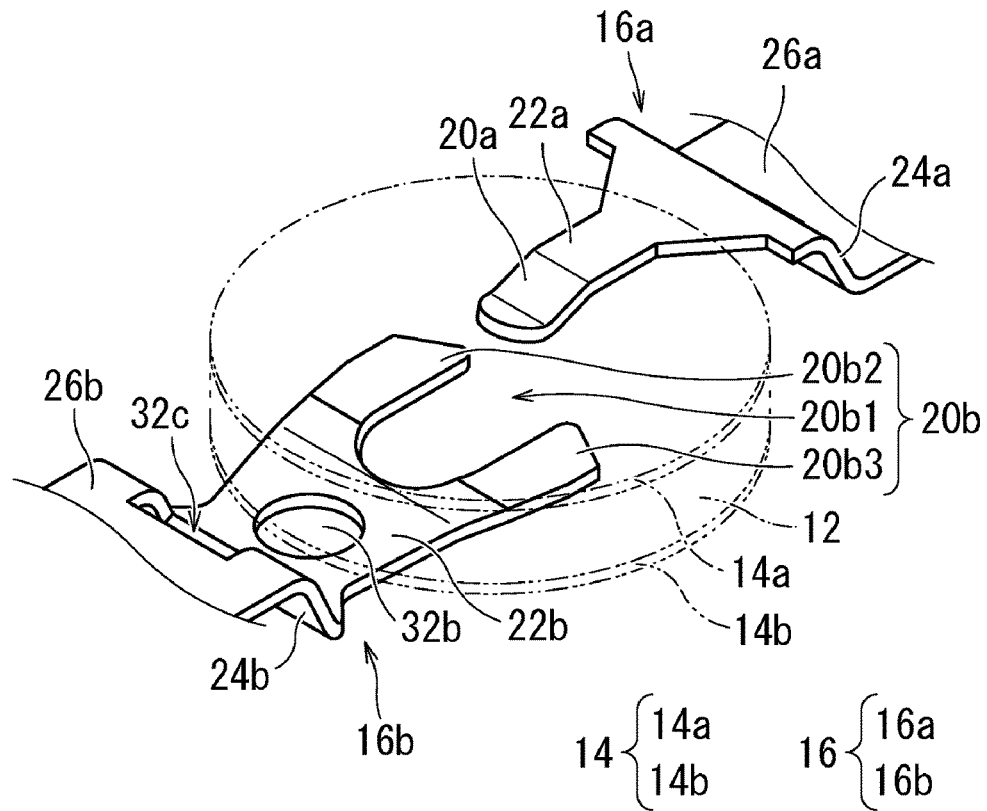
FIG. 9 is a perspective illustration view showing a state in which an element is held by the first bonding portion of a first metal terminal and a second bonding portion of a second metal terminal in a surface mount electronic component according to a preferred embodiment of the present invention.

The second bonding portion 20b of the second metal terminal 16b is a portion connected to the second external electrode 14b disposed on the surface of the second main surface 12b of the element 12. As shown in FIG. 9, the second bonding portion 20b of the second metal terminal 16b includes a bifurcated (for example, wrench-shaped) distal end, and the second bonding portion 20b is in surface contact with the second external electrode 14b at the bifurcated portion.

That is, a space forming portion 20b1 is provided at a central portion of an end side opposite to a side connected to the fifth extending portion 22b of the second metal terminal 16b, provides a predetermined interval, and the second bonding portion 20b includes one bonding piece 20b2 of the bifurcated shape and the other bonding piece 20b3. Consequently, a contact area between the second metal terminal 16b and the second external electrode 14b is increased. Thus, the element 12 is stably supported with good posture by the second external electrode 14b, and the bonding strength is increased.

Figure 10A:
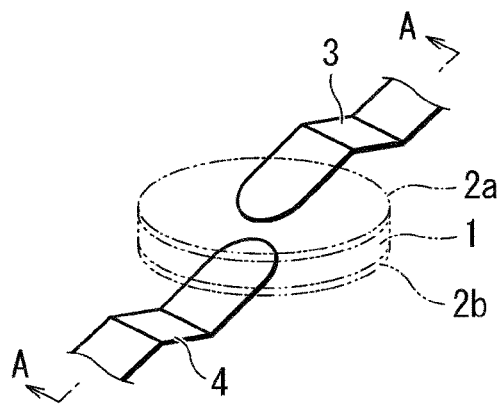
FIG. 10A shows a state in which an element is held by a conventional first metal terminal and a conventional second metal terminal.
Figure 10B:
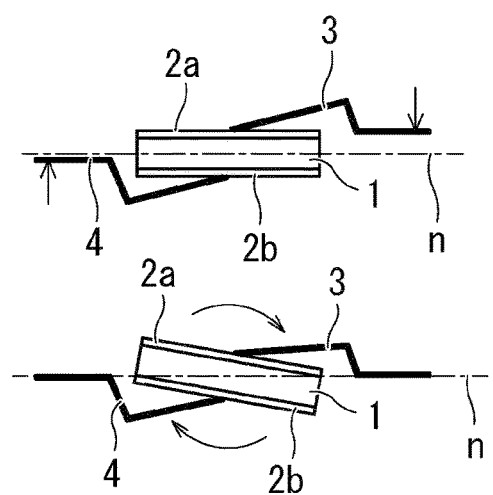
FIG. 10B shows a state showing a result when the element is held by the conventional first metal terminal and the conventional second metal terminal.

FIG. 10A shows a state in which an element is held by a conventional first metal terminal and a conventional second metal terminal, and FIG. 10B shows a result when the element is held by the conventional first metal terminal and the conventional second metal terminal. In a surface mount electronic component shown in FIGS. 10A and 10B, first and second external electrodes 2a and 2b are provided on both main surfaces of an element 1, a first external electrode 2a and a first metal terminal 3 are connected to each other, and a second external electrode 2b and a second metal terminal 4 are connected to each other.

If the shape of the second bonding portion 20b is not the bifurcated shape (wrench shape) as in the present preferred embodiment but is the conventional shape as shown in FIG. 10A, the center of gravity of the element 1 cannot be supported vertically, so that the element 1 may rotate. If the element 1 rotates, as shown in FIG. 10B, the element 1 is obliquely mounted with respect to a plane n parallel or substantially parallel to a mounting surface, so that there is a problem that a mounting height of the surface mount electronic component is increased.

The bifurcated shape of the distal end of the second bonding portion 20b is not particularly limited to a wrench shape, and may be a U shape or a C shape, for example.

The entire width (width including both arms of the bifurcated shape) of the second bonding portion 20b of the second metal terminal 16b is preferably not less than about 2.3 mm and not more than about 2.7 mm, for example.

The first extending portion 22a of the first metal terminal 16a is connected to the first bonding portion 20a and extends in the direction parallel or substantially parallel to the first main surface 12a of the element 12 with the space t1 from the first main surface 12a. In this manner, the first extending portion 22a is disposed with the space t1 from the first main surface 12a, wherein a flow path of the exterior material 18 is provided, and improved withstand voltage performance and moisture resistance performance are obtained.

The width of the first extending portion 22a of the first metal terminal 16a is preferably not less than about 0.5 mm and not more than about 2.7 mm, for example. The length of the first extending portion 22a is preferably not less than about 1.8 mm and not more than about 2.2 mm, for example.

In a portion of the first extending portion 22a, a surface thereof is processed into a concave shape, and the parent material of the first metal terminal 16a may be exposed at the processed portion. Consequently, even if the bonding material 40 in the first bonding portion 20a, for example, solder melts, since the wettability of the solder decreases due to exposure of the parent material of the first metal terminal 16a at the concave-shaped processed portion, flowing out of the solder is blocked, so that flowing of the melting solder to the outside of the exterior material 18 is reduced or prevented.

The fifth extending portion 22b of the second metal terminal 16b is connected to the second bonding portion 20b and extends in the direction parallel or substantially parallel to the second main surface 12b of the element 12 with the space t2 from the second main surface 12b. In this manner, the fifth extending portion 22b is disposed with the space t2 from the second main surface 12b, wherein the flow path of the exterior material 18 is provided, and improved withstand voltage performance and moisture resistance performance are obtained.

The width of the fifth extending portion 22b of the second metal terminal 16b is preferably not less than about 1.5 mm and not more than about 2.7 mm, for example. The length of the fifth extending portion 22b is preferably not less than about 1.4 mm and not more than about 1.8 mm, for example.

In a portion of the fifth extending portion 22b, a surface thereof is processed into a concave shape to provide a processed portion, and the parent material of the second metal terminal 16b may be exposed at the processed portion.

Consequently, even if the bonding material 40 in the second bonding portion 20b melts, since the wettability of the solder decreases due to exposure of the parent material of the second metal terminal 16b at the concave-shaped processed portion, flowing out of the solder is blocked, so that flowing of the melting solder to the outside of the exterior material 18 is reduced or prevented.

The second extending portion 24a of the first metal terminal 16a is connected to the first extending portion 22a and extends towards the element 12. Specifically, the second extending portion 24a is curved from a terminal end of the first extending portion 22a and extends to a central portion of the element. The curved portion may be gently curved, or may be curved such that the angle of the curved portion is a right angle or substantially a right angle.

The width of the second extending portion 24a of the first metal terminal 16a is preferably not less than about 2.3 mm and not more than about 2.7 mm, for example. The length of the second extending portion 24a is preferably not less than about 0.6 mm and not more than about 1.0 mm, for example.

The sixth extending portion 24b of the second metal terminal 16b is connected to the fifth extending portion 22b and extends towards the element 12. Specifically, the sixth extending portion 24b is curved from a terminal end of the fifth extending portion 22b and extends to the central portion of the element. The curved portion may be gently curved, or may be curved such that the angle of the curved portion is a right angle or substantially a right angle.

The width of the sixth extending portion 24b of the second metal terminal 16b is preferably not less than about 2.3 mm and not more than about 2.7 mm, for example. The length of the sixth extending portion 24b is preferably not less than about 0.6 mm and not more than about 1.0 mm, for example.

The third extending portion 26a of the first metal terminal 16a is connected to the second extending portion 24a and extends in the direction parallel or substantially parallel to the first main surface 12a of the element 12. Specifically, the third extending portion 26a is curved from a terminal end of the second extending portion 24a and extends in the direction parallel or substantially parallel to the first main surface 12a. The curved portion may be gently curved, or may be curved such that the angle of the curved portion is a right angle or substantially a right angle.

The width of the third extending portion 26a of the first metal terminal 16a is preferably not less than about 2.3 mm and not more than about 2.7 mm, for example. The length of the third extending portion 26a is preferably not less than about 1.0 mm and not more than about 1.4 mm, for example.

The seventh extending portion 26b of the second metal terminal 16b is connected to the sixth extending portion 24b and extends in the direction parallel or substantially parallel to the second main surface 12b of the element 12. Specifically, the seventh extending portion 26b is curved from a terminal end of the sixth extending portion 24b and extends in the direction parallel or substantially parallel to the second main surface 12b. The curved portion may be gently curved, or may be curved such that the angle of the curved portion is a right angle or substantially a right angle.

The width of the seventh extending portion 26b of the second metal terminal 16b is preferably not less than about 2.3 mm and not more than about 2.7 mm, for example. The length of the seventh extending portion 26b is preferably not less than about 1.0 mm and not more than about 1.4 mm, for example.

The fourth extending portion 28a of the first metal terminal 16a is connected to the third extending portion 26a and extends in the mounting direction. Specifically, the fourth extending portion 28a is curved from a terminal end of the third extending portion 26a and extends in a direction of the mounting surface. The curved portion may be gently curved, or may be curved such that the angle of the curved portion is a right angle or substantially a right angle.

The width of the fourth extending portion 28a of the first metal terminal 16a is preferably not less than about 2.3 mm and not more than about 2.7 mm, for example. The length of the fourth extending portion 28a is preferably not less than about 1.0 mm and not more than about 1.4 mm, for example.

The eighth extending portion 28b of the second metal terminal 16b is connected to the seventh extending portion 26b and extends in the mounting direction. Specifically, the eighth extending portion 28b is curved from a terminal end of the seventh extending portion 26b and extends in the direction of the mounting surface. The curved portion may be gently curved, or may be curved such that the angle of the curved portion is a right angle or substantially a right angle.

The width of the eighth extending portion 28b of the second metal terminal 16b is preferably not less than about 2.3 mm and not more than about 2.7 mm, for example. The length of the eighth extending portion 28b is preferably not less than about 1.0 mm and not more than about 1.4 mm, for example.

The first mounting portion 30a of the first metal terminal 16a is a portion connected to the fourth extending portion 28a and mounted on the mounting substrate. Specifically, the first mounting portion 30a is curved from a terminal end of the fourth extending portion 28a and extends parallel or substantially parallel to the mounting surface. A gap portion 30a1 preferably having a rectangular or substantially rectangular shape, for example, is provided at a central portion of an end side opposite to a side connected to the fourth extending portion 28a of the first mounting portion 30a. Two mounting pieces 30a2 and 30a3 are arranged at the end side opposite to the side connected to the fourth extending portion 28a of the first mounting portion 30a with the gap portion 30a1 provided between the mounting pieces 30a2 and 30a3. In this manner, since the end side opposite to the side connected to the fourth extending portion 28a of the first mounting portion 30a is bifurcated into the mounting pieces 30a2 and 30a3 by the gap portion 30a1, even when the mounting piece 30a2 of the first mounting portion 30a is deformed, the connection state is able to be maintained by the mounting piece 30a3. Similarly, even when the mounting piece 30a3 is deformed, the connection state is able to be maintained by the mounting piece 30a2, so that mounting reliability is maintained. Accordingly, if the first mounting portion 30a is deformed in a state in which the gap portion 30a1 is not provided, there is a possibility that mounting reliability cannot be ensured such as not being able to be connected to the mounting substrate. In the first mounting portion 30a, the gap portion 30a1 may not be provided.

Figure 11:
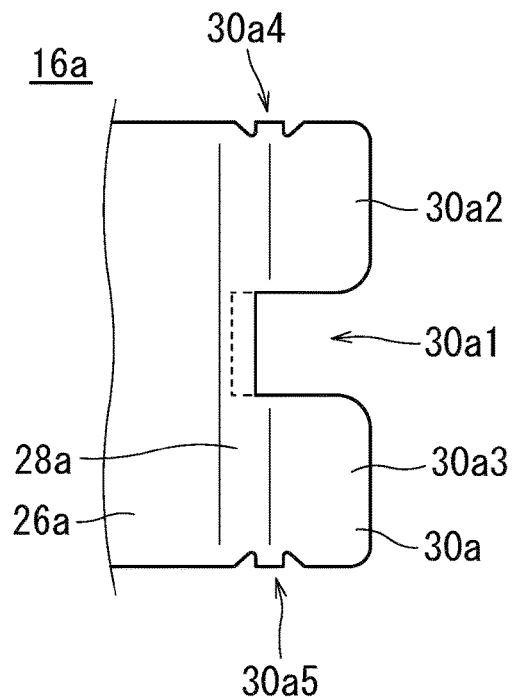
FIG. 11 is an enlarged view showing a second mounting portion of the second metal terminal according to a preferred embodiment of the present invention.

As shown in FIG. 11, a plurality of small bending notches 30a4 and 30a5 are provided at portions of both ends in a connecting portion between the first mounting portion 30a and the fourth extending portion 28.

This makes it possible to reduce physical resistance when the first mounting portion 30a is bent, leading to a stable bending angle, and improving the mounting reliability onto the mounting substrate.

In the first mounting portion 30a, the bending notches 30a4 and 30a5 may not be provided.

Figure 12:
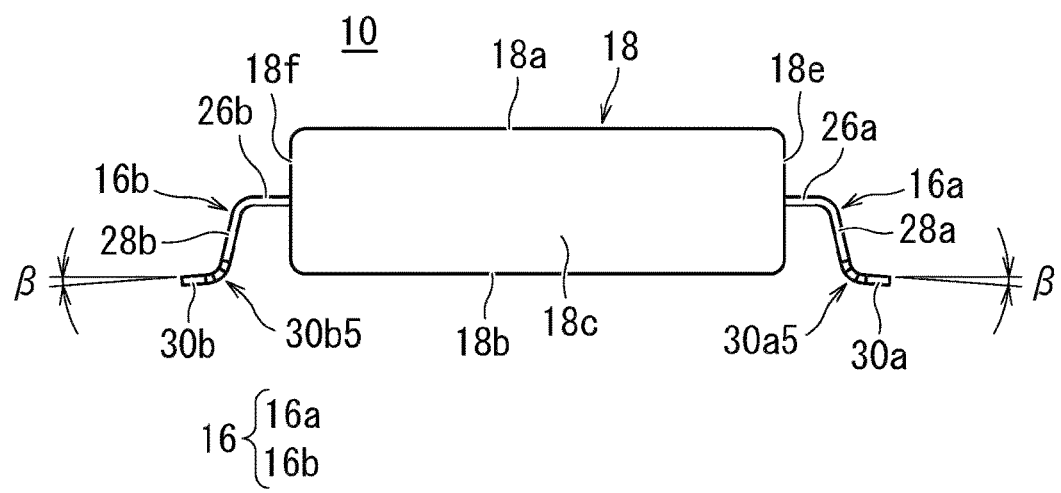
FIG. 12 is a side view of a surface mount electronic component according to a preferred embodiment of the present invention and a view showing a mounting state of the first mounting portion of the first metal terminal and the second mounting portion of the second metal terminal.

As shown in FIG. 12, it is preferable that the first mounting portion 30a is curved such that an extending angle β of the first mounting portion 30a is not less than about 0° and not more than about 10°, for example, with respect to the mounting surface (horizontal surface). Consequently, it is possible to provide an appropriate amount of solder fillet while ensuring installation reliability for mounting with a mounter, thus improving the mounting reliability.

The width of the first mounting portion 30a of the first metal terminal 16a is preferably not less than about 2.3 mm and not more than about 2.7 mm, for example. The length of the first mounting portion 30a is preferably not less than about 0.3 mm and not more than about 0.7 mm, for example.

The second mounting portion 30b of the second metal terminal 16b is a portion connected to the eighth extending portion 28b and mounted on the mounting substrate. Specifically, the second mounting portion 30b is curved from a terminal end of the eighth extending portion 28b and extends parallel or substantially parallel to the mounting surface. A gap portion 30b1 preferably having a rectangular or substantially rectangular shape, for example, is provided at a central portion of an end side opposite to a side connected to the eighth extending portion 28b of the second mounting portion 30b. Two mounting pieces 30b2 and 30b3 are arranged at the end side opposite to the side connected to the eighth extending portion 28b of the second mounting portion 30b with the gap portion 30b1 provided between the mounting pieces 30b2 and 30b3. Since the end side opposite to the side connected to the eighth extending portion 28b of the second mounting portion 30b is bifurcated into the mounting pieces 30b2 and 30b3 by the gap portion 30b1, even when the mounting piece 30b2 of the second mounting portion 30b is deformed, the connection state is able to be maintained by the mounting piece 30b3. Similarly, even when the mounting piece 30b3 is deformed, the connection state is able to be maintained by the mounting piece 30b2, so that the mounting reliability is maintained. Accordingly, if the second mounting portion 30b is deformed in a state in which the gap portion 30b1 is not provided, there is a possibility that the mounting reliability cannot be ensured such as not being able to be connected to the mounting substrate. In the second mounting portion 30b, the gap portion 30b1 may not be provided.

A plurality of small bending notches 30b4 and 30b5 are provided at portions of both ends in a connecting portion between the second mounting portion 30b and the eighth extending portion 28b. This makes it possible to reduce physical resistance when the second mounting portion 30b is bent, leading to a stable bending angle, and improving the mounting reliability onto the mounting substrate. In the second mounting portion 30b, the bending notches 30b4 and 30b5 may not be provided.

As in the first mounting portion 30a, it is preferable that the second mounting portion 30b is curved such that the extending angle β of the second mounting portion 30b is not less than about 0° and not more than about 10°, for example, with respect to the mounting surface (horizontal surface). Consequently, it is possible to provide an appropriate amount of solder fillet while ensuring installation reliability for mounting with a mounter, thus improving the mounting reliability.

The width of the second mounting portion 30b of the second metal terminal 16b is preferably not less than about 2.3 mm and not more than about 2.7 mm, for example. The length of the second mounting portion 30b is preferably not less than about 0.3 mm and not more than about 0.7 mm, for example.

The first metal terminal 16a includes a first cut-out portion 32a in a portion in which the second extending portion 24a and the third extending portion 26a of the first metal terminal 16a intersect with each other. As shown in FIG. 6, the first cut-out portion 32a is covered with the exterior material 18. Consequently, the flow path of the exterior material is provided when the exterior material is molded by injection molding, transfer molding, or other suitable method, and the filling property of the exterior material is improved, so that improved withstand voltage performance, moisture resistance reliability, and other advantageous characteristics are obtained. Although the shape of the first cut-out portion 32a is not particularly limited, it is preferable that the first cut-out portion 32a has a rectangular or substantially rectangular shape, for example. The width of the first cut-out portion 32a is preferably not less than about 0.4 mm and not more than about 0.8 mm, for example. The length of the first cut-out portion 32a is preferably not less than about 1.0 mm and not more than about 1.4 mm, for example.

The second metal terminal 16b includes a second cut-out portion 32b in the fifth extending portion 22b of the second metal terminal 16b. As shown in FIG. 6, the second cut-out portion 32b is covered with the exterior material 18. Consequently, the flow path of the exterior material 18 is provided when the exterior material 18 is molded by injection molding, transfer molding, or other suitable method, and the filling property of the exterior material is improved, so that improved withstand voltage performance, moisture resistance reliability, and other advantageous characteristics are obtained. Although the shape of the second cut-out portion 32b is not particularly limited, it is preferable that the second cut-out portion 32b has a circular or substantially circular shape, for example. As the size of the second cut-out portion 32b, the diameter is preferably not less than about 0.5 mm and not more than about 1.5 mm, for example.

The second metal terminal 16b includes a third cut-out portion 32c in a portion in which the sixth extending portion 24b and the seventh extending portion 26b of the second metal terminal 16b intersect with each other. As shown in FIG. 6, the third cut-out portion 32c is covered with the exterior material 18. Consequently, the flow path of the exterior material is provided when the exterior material 18 is molded by injection molding, transfer molding, or other suitable method, and the filling property of the exterior material 18 is improved, so that improved withstand voltage performance, moisture resistance reliability, and other advantageous characteristics are obtained. Although the shape of the third cut-out portion 32c is not particularly limited, it is preferable that the third cut-out portion 32c has a rectangular or substantially rectangular shape, for example. The width of the third cut-out portion 32c is preferably not less than about 0.4 mm and not more than about 0.8 mm, for example. The length of the third cut-out portion 32c is preferably not less than about 1.0 mm and not more than about 1.4 mm, for example.

The exterior material 18 covers the element 12, the first external electrode 14a, the second external electrode 14b, a portion of the first metal terminal 16a, a portion of the second metal terminal 16b, a bonding portion between the first external electrode 14a and the first metal terminal 16a, and a bonding portion between the second external electrode 14b and the second metal terminal 16b.

The exterior material 18 preferably has a rectangular or substantially rectangular parallelepiped shape, for example, and includes a first main surface 18a and a second main surface 18b facing the first main surface 12a of the element 12, a first side surface 18c and a second side surface 18d orthogonal to the first main surface 18a and the second main surface 18b and extending in a length direction (a direction in which the metal terminal 16 extends), and a first end surface 18e and a second end surface 18f orthogonal to the first main surface 18a, the second main surface 18b, the first side surface 18c, and the second side surface 18d. In the shape of the exterior material 18, a central portion of the thickness direction (directions of the first main surface 18a and the second main surface 18b) may have slightly convex shape along a circumferential direction. The shape of a corner portion of the exterior material 18 is not particularly limited, and the corner portion may be rounded. Specifically, it is preferable that the exterior material 18 is molded in a tablet shape having a diameter of not less than about 10 mm and not more than about 20 mm, for example.

The first main surface 18a and the second main surface 18b of the exterior material 18 are preferably flat or substantially flat.

The material of the exterior material 18 is preferably, for example, provided by coating a resin, such as a liquid or powder silicone or epoxy resin. As the material of the exterior material 18, an engineering plastic may be molded by an injection molding method, a transfer molding method, or other suitable method.

In particular, the exterior material 18 is preferably made of a thermosetting epoxy resin. Consequently, adhesion between the exterior material 18 and the element 12 or the metal terminal 16 is ensured, and improved withstand voltage and moisture resistance performance are obtained.

In the thickness of the exterior material 18, a thickness from a surface of the first external electrode 14a of the element 12 to the first main surface 18a of the exterior material 18 and a thickness from a surface of the second external electrode 14b of the element 12 to the second main surface 18b of the exterior material 18 are preferably not less than about 0.5 mm and not more than about 0.8 mm, for example. Further, a thickness from the side surface 12c of the element 12 on the side closest to the first end surface 18e of the exterior material 18 to the first end surface 18e of the exterior material 18 and a thickness from the side surface 12c of the element 12 on the side closest to the second end surface 18f of the exterior material 18 to the second end surface 18f of the exterior material 18 are preferably not less than about 1.3 mm and not more than about 2.5 mm, for example. Furthermore, a thickness from the side surface 12c of the element 12 on the side closest to the first side surface 18c of the exterior material 18 to the first side surface 18c of the exterior material 18 and a thickness from the side surface 12c of the element 12 on the side closest to the second side surface 18d of the exterior material 18 to the second side surface 18d of the exterior material 18 are preferably not less than about 0.2 mm and not more than about 1.4 mm, for example. Consequently, it is possible to provide required withstand voltage and reliability between the metal terminal 16 and the exterior material 18 while maintaining the small product size.

The first external electrode 14a and the first metal terminal 16a are connected by the bonding material 40, and the second external electrode 14b and the second metal terminal 16b are connected by the bonding material 40. The bonding material 40 is preferably a solder, and more preferably a lead-free solder having a high melting point.

The lead-free solder having a high melting point is preferably a lead-free solder, such as Sn—Sb based solder, Sn—Ag—Cu based solder, Sn—Cu based solder, or Sn—Bi based solder, and is more preferably a Sn-10Sb to Sn-15Sb solder, for example. The lead-free solder having a high melting point is more preferably a Sn-13Sb alloy solder, for example.

Figure 13:
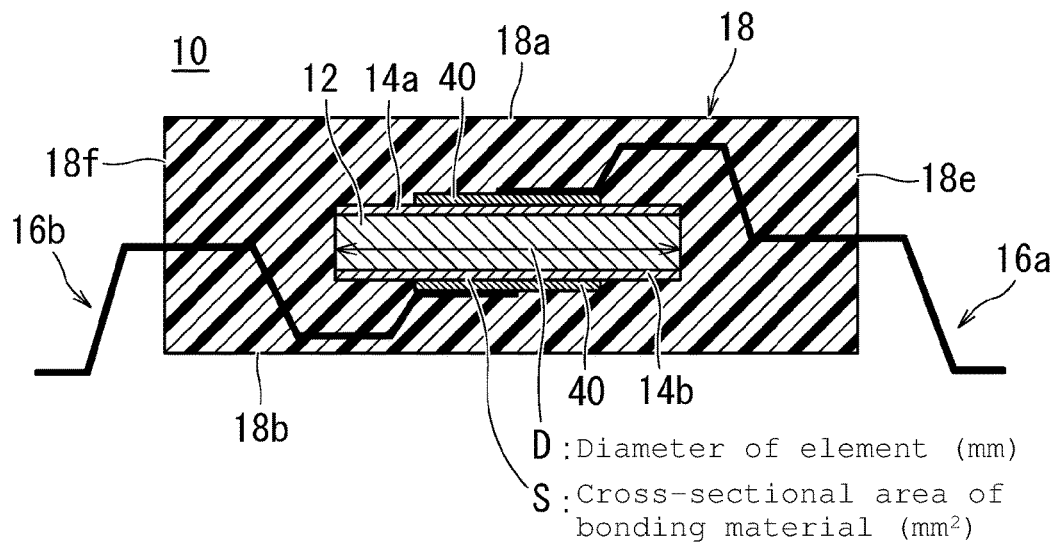
FIG. 13 is a cross-sectional schematic view of a surface mount electronic component according to a preferred embodiment of the present invention and a view showing a relationship between a diameter D of an element and a cross-sectional area S of a solder.

As shown in FIG. 13, the solder (the bonding material 40) satisfies a relational expression "element diameter D (mm)× about 0.003 mm≤solder cross-sectional area S (mm$^2$)≤element diameter D (mm)×about 0.02 mm". This relational expression is required to be satisfied with respect to both the solder (the bonding material 40) for bonding the first external electrode 14a and the first metal terminal 16a and the solder (the bonding material 40) for bonding the second external electrode 14b and the second metal terminal 16b. Consequently, since the solder amount is set within an appropriate range, even if the solder melts or expands when the surface mount electronic component 10 is reflow-mounted on the mounting substrate, flowing of the solder between the covering member (coating portion, coating material) and the element 12 is reduced or prevented while bonding is secured, so that short-circuiting is avoided. According to the verification result, a minimum value of a thickness of a peeling portion was about 0.02 mm. In a case of "solder cross-sectional area S (mm$^2$)>element diameter D (mm)×about 0.02 mm", the solder volume exceeds the space size of the cross section, so that the solder reaches an electrode on the opposite side through an element side surface, thus leading to short-circuiting. On the other hand, in a case of "element diameter D (mm)×about 0.003 mm>solder cross-sectional area S (mm$^2$)", the thickness of the solder may be less than the unevenness of the element, and portions which do not come into close contact with each other are generated between the metal terminal 16 and the element 12, so that the bonding strength decreases.

From the viewpoint of bonding strength, it is preferable that the relational expression "solder cross-sectional area S (mm$^2$)≥element diameter D (mm)×about 0.003 mm" is satisfied. Consequently, it is possible to secure bonding between the external electrode 14 and the metal terminal 16.

Figure 14:
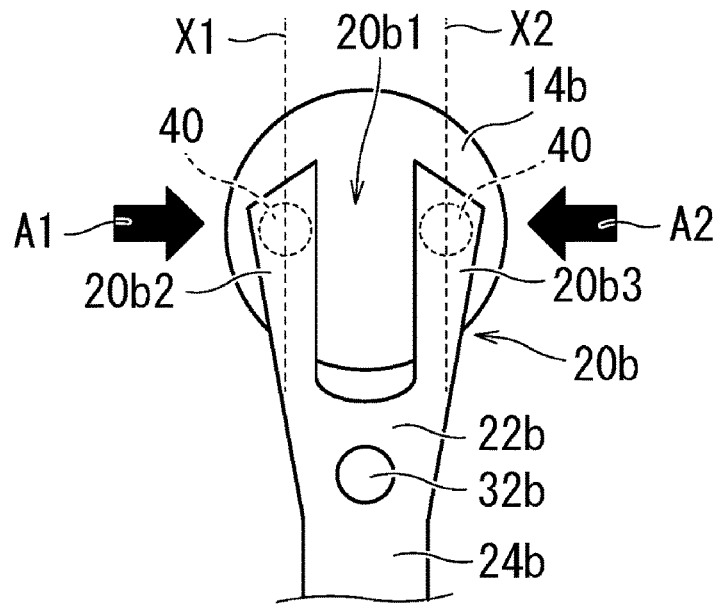
FIG. 14 is an explanatory view for explaining a method of measuring the cross-sectional area S of the solder.

In a method of measuring the cross-sectional area of the solder, the metal terminal 16 is polished at the cross section of the surface mount electronic component 10 to a position at which the width of the solder is largest, and the width and height of the solder are obtained from the cross section to calculate the cross-sectional area. For example, in a case of a shape similar to the second metal terminal 16b, as shown in FIG. 14, the surface mount electronic component 10 is polished from the direction of the arrow A1, and the width and height of the solder at a position at which the area of the solder (the bonding material 40) is largest (a portion shown by a dashed line X1) are obtained to calculate the cross section. Alternatively, the surface mount electronic component 10 is polished from the direction of the arrow A2, and the width and height of the solder at a position at which the area of the solder (the bonding material 40) is largest (a portion shown by a dashed line X2) are obtained to calculate the cross section.

Further, regarding the method of measuring the cross-sectional area of the solder (the bonding material 40), a complicated shape of the distal end of the first bonding portion 20a of the first metal terminal 16a, more specifically, a portion at which the distal end 20a2 is disposed in the direction away from the first main surface 12a as it approaches from the intermediate portion 20a1 of the first bonding portion 20a towards the distal end 20a2 and the intermediate portion 20a1 (that is, a portion located on the opposite side of the distal end of the first bonding portion 20a) of the first bonding portion 20a is in surface contact with the first external electrode 14a, is selected using a microscope, wherein the area is calculated from the number of pixels. On this occasion, the cross-section polishing is performed to a position at which the solder width is largest at each bonding portion.

The dimension in the length direction of the surface mount electronic component 10 (a direction in which the metal terminal extends) including the exterior material 18, the first metal terminal 16a, and the second metal terminal 16b is defined as the L dimension of the surface mount electronic component 10, the dimension in the thickness direction of the exterior material 18 (a direction connecting the first main surface 18a and the second main surface 18b of the exterior material 18) is defined as the T dimension of the surface mount electronic component 10, and the dimension in the width direction of the exterior material 18 (a direction connecting the first side surface 18c and the second side surface 18d of the exterior material 18) is defined as the W dimension of the surface mount electronic component 10.

Although the dimensions of the surface mount electronic component 10 are not particularly limited, the L dimension in the length direction is preferably not less than about 10.9 mm and not more than about 11.9 mm, the W dimension in the width direction is not less than about 5.5 mm and not more than about 6.5 mm, and the T dimension in the thickness direction is not less than about 2.3 mm and not more than about 2.5 mm, for example.

Next, a preferred embodiment of a method of manufacturing a surface mount electronic component having the above-described configuration will be described by taking the surface mount electronic component 10 as an example.

First, raw materials for manufacturing the element are provided and weighed.

Then, cobblestone is added to the raw material to be mixed and ground, and thus to be stirred, wherein the raw material is prepared.

Then, the prepared raw material is dried with a spray drier or other suitable drier.

Subsequently, an additive, a binder or another ingredient is added to the raw material to prepare a two-component raw material, and the two-component raw material is finely pulverized and then calcined.

Then, the calcined raw material is molded into a sheet shape using an extruder or other suitable device.

Then, the sheet, which has been molded into a sheet shape, is punched into a disk tablet shape using a press molding machine or other suitable machine. Then, the sheet punched into a disk shape is filled into a firing sagger, firing is performed, and the element 12 having a disk shape is manufactured. Although the firing temperature depends on a dielectric material, it is preferably not less than about 1100° C. and not more than about 1400° C., for example.

Then, the fired element 12 is set in a dry plating apparatus having a vacuum chamber, and the pressure is reduced.

Then, the element 12 in the reduced pressure atmosphere is preheated at a temperature of not less than about 50° C. and less than about 150° C., for example. At this time, since the element 12 is preheated in a state of being set in a reduced pressure atmosphere having an atmospheric pressure of about 0.5 torr, for example, even when the heating temperature is as low as not less than about 50° C. and less than about 150° C., for example, foreign matters such as moisture adhered to the element 12 is able to be removed efficiently.

Subsequently, when the preheating is completed, the interior of the vacuum chamber is evacuated again with a vacuum pump.

Then, the external electrodes 14 are formed on both main surfaces of the element 12 by a dry plating method, such as vacuum vapor deposition, sputtering, ion plating, or plasma spraying in a state in which the atmospheric pressure in the vacuum chamber is stabilized at not less than about $10^{-6}$ torr and not more than about $10^{-3}$ torr, for example.

The first metal terminal 16a and the second metal terminal 16b are prepared. The first metal terminal 16a and the second metal terminal 16b are molded by bending. The first cut-out portion 32a formed in the first metal terminal 16a and the second cut-out portion 32b and the third cut-out portion 32c formed in the second metal terminal 16b are formed by punching.

First, the bonding material 40 is applied onto an upper surface of the second bonding portion 20b of the second metal terminal 16b (a surface facing the second main surface 12b of the element 12). In this preferred embodiment, solder is preferably used as the bonding material 40.

Then, the element 12 on which the external electrode 14 is formed is inserted between the first metal terminal 16a and the second metal terminal 16b.

Subsequently, the bonding material 40 is applied onto a contact surface between the first metal terminal 16a and the element 12. In this preferred embodiment, solder is preferably used as the bonding material 40.

Then, soldering is performed by reflow. As the soldering temperature, a heat of, for example, not less than about 270° C. and not more than about 300° C. is applied in reflow for not less than about 20 seconds, for example.

Subsequently, in order to remove flux components included in the solder, ultrasonic cleaning using a solvent is performed. This is because if the flux remains attached, the adhesion between the exterior material 18 and the element 12 decreases, which causes a decrease in withstand voltage and moisture resistance performance.

Next, the exterior material 18 will be described. As the exterior material 18, an epoxy resin or other suitable material excellent in moisture resistance is suitable.

Then, the metal terminal 16 after flux cleaning treatment is fixed in a transfer mold die which has been preheated to a range of not less than about 170° C. and not more than about 190° C., for example.

Subsequently, a tablet-shaped epoxy resin is pressed into the die by a plunger at a pressure of not less than about 10 MPa and not more than about 20 MPa, for example for about 60 seconds to form the exterior material 18 as shown in FIG. 1.

Then, after the exterior material 18 is formed, the metal terminal 16 protruding from the exterior material 18 is bent along the side surface and the bottom surface of the exterior material 18 to obtain the surface mount electronic component 10 shown in FIG. 1.

In the surface mount electronic component 10 shown in FIG. 1, the element 12 on which the external electrode 14 is disposed is supported not by a lead wire but by the metal terminal 16 and is able to be mounted on the mounting substrate by the metal terminal 16, and therefore, mounting by reflow is made possible.

Further, in the surface mount electronic component 10 shown in FIG. 1, the first metal terminal 16a includes the first bonding portion 20a connected to the first external electrode 14a, the first extending portion 22a connected to the first bonding portion 20a and extending in the direction parallel or substantially parallel to the first main surface 12a with a space t1 from the first main surface 12a, the second extending portion 24a connected to the first extending portion 22a and extending towards the element 12, the third extending portion 26a connected to the second extending portion 24a and extending in the direction parallel or substantially parallel to the first main surface 12a, the fourth extending portion 28a connected to the third extending portion 26a and extending in the mounting direction, and the first mounting portion 30a connected to the fourth extending portion 28a and mounted on the mounting substrate. In addition, the second metal terminal 16b includes the second bonding portion 20b connected to the second external electrode 14b, the fifth extending portion 22b connected to the second bonding portion 20b and extending in the direction parallel or substantially parallel to the second main surface 12b with a space t2 from the second main surface 12b, the sixth extending portion 24b connected to the fifth extending portion 22b and extending towards the element 12, the seventh extending portion 26b connected to the sixth extending portion 24b and extending in the direction parallel or substantially parallel to the second main surface 12b, the eighth extending portion 28b connected to the seventh extending portion 26b and extending in the mounting direction, and the second mounting portion 30b connected to the eighth extending portion 28b and mounted on the mounting substrate.

According to the above configuration, the case member as disclosed in Japanese Patent Application Laid-Open No. 2007-81250 is not required, and the shape of the metal terminal 16 is optimized, so that an increase in the height dimension of the surface mount electronic component 10 is prevented, and the height of the surface mount electronic component 10 is reduced.

Further, in the surface mount electronic component 10 shown in FIG. 1, since the first main surface 18a and the second main surface 18b of the exterior material 18 are preferably flat or substantially flat, sufficient flatness is ensured. Thus, it is possible to prevent suction failure of a mounter of a mounting machine used to mount the surface mount electronic component on the mounting substrate, and to reliably mount the surface mount electronic component on the mounting substrate. As a result, occurrence of mounting failure is prevented.

According to the surface mount electronic component 10 shown in FIG. 1, the first external electrode 14a and the first metal terminal 16a are connected by the bonding material 40, and the second external electrode 14b and the second metal terminal 16b are connected by the bonding material 40. When the bonding material 40 is a lead-free solder having a high melting point, while bonding strength between the element 12 and the metal terminal 16 is ensured, heat resistance of the bonding portion to a flow or reflow temperature during mounting of the board is also ensured.

Further, in the surface mount electronic component 10 shown in FIG. 1, if the lead-free solder having a high melting point is a lead-free solder, such as Sn—Sb based solder, Sn—Ag—Cu based solder, Sn—Cu based solder, or Sn—Bi based solder, for example, and particularly a Sn-10Sb to Sn-15Sb solder, for example, the heat resistance of the bonding portion during mounting is ensured.

Further, in the surface mount electronic component 10 shown in FIG. 1, when the external electrode 14 includes the Ni—Ti alloy layer made of a Ni—Ti alloy and the Cu layer made of Cu and disposed on the surface of the Ni—Ti alloy layer, it is possible to improve the bonding strength between the element 12 and the Cu layer by the Ni—Ti alloy layer in the external electrode 14, and to improve electroconductivity and ensure the bonding strength between the Cu layer and the bonding material by the Cu layer.

In the surface mount electronic component 10 shown in FIG. 1, when the exterior material 18 is made of a thermosetting epoxy resin, the adhesion between the exterior material 18 and the element 12 or the metal terminal 16 is ensured, and improved withstand voltage and moisture resistance performance are obtained.

In the surface mount electronic component 10 shown in FIG. 1, the element 12 preferably has a disk shape, and when the diameter of the element 12 is not less than about 0.3 mm and not more than about 6.0 mm, for example, and the thickness of the element 12 is not less than about 0.8 mm and not more than about 1.2 mm, for example, since the shape of the element 12 is optimized, the size and height of the surface mount electronic component 10 are reduced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A surface mount electronic component comprising:
   an element including a dielectric layer including a first main surface and a second main surface;
   a first external electrode disposed on the first main surface;
   a second external electrode disposed on the second main surface;
   a first metal terminal connected to the first external electrode;
   a second metal terminal connected to the second external electrode; and
   an exterior material covering at least a portion of the element, the first and second external electrodes, and the first and second metal terminals; wherein
   upper and lower surfaces of the exterior material are flat or substantially flat;
   the first metal terminal includes:
      a first bonding portion connected to the first external electrode;
      a first extending portion connected to the first bonding portion and extending in a direction parallel or substantially parallel to the first main surface with a space from the first main surface;
      a second extending portion connected to the first extending portion and extending towards the element;
      a third extending portion connected to the second extending portion and extending in the direction parallel or substantially parallel to the first main surface;
      a fourth extending portion connected to the third extending portion and extending in a mounting direction; and
      a first mounting portion connected to the fourth extending portion and mounted on a mounting substrate;
   the second metal terminal includes:
      a second bonding portion connected to the second external electrode;
      a fifth extending portion connected to the second bonding portion and extending in a direction parallel or substantially parallel to the second main surface with a space from the second main surface;
      a sixth extending portion connected to the fifth extending portion and extending towards the element;
      a seventh extending portion connected to the sixth extending portion and extending in the direction parallel or substantially parallel to the second main surface;

an eighth extending portion connected to the seventh extending portion and extending in the mounting direction; and a second mounting portion connected to the eighth extending portion and mounted on the mounting substrate;

in the first bonding portion, a distal end of the first bonding portion is disposed in a direction away from the first main surface from an intermediate portion of the first bonding portion towards the distal end, and the first bonding portion is in surface contact with the first external electrode at the intermediate portion located on an opposite side of the distal end;

a first cut-out portion is provided in a portion in which the second extending portion of the first metal terminal and the third extending portion of the first metal terminal intersect with each other;

the second bonding portion includes a bifurcated distal end and is in surface contact with the second external electrode at the bifurcated portion;

a second cut-out portion is provided in the fifth extending portion of the second metal terminal;

a third cut-out portion is provided in a portion in which the sixth extending portion of the second metal terminal and the seventh extending portion of the second metal terminal intersect with each other; and the first, second and third cut-out portions are covered with the exterior material.

2. The surface mount electronic component according to claim 1, wherein the first external electrode and the first metal terminal are connected by a bonding material;

the second external electrode and the second metal terminal are connected by the bonding material; and the bonding material is a lead-free solder.

3. The surface mount electronic component according to claim 2, wherein the lead-free solder is a Sn-10Sb to Sn-15Sb alloy solder.

4. The surface mount electronic component according to claim 1, wherein the first external electrode and the second external electrode include a first electrode layer made of a Ni—Ti alloy and a second electrode layer made of Cu.

5. The surface mount electronic component according to claim 4, wherein each of the first external electrode and the second external electrode includes two of the first electrode layers and two of the second electrode layers that are alternately arranged.

6. The surface mount electronic component according to claim 4, wherein a thickness of each of the first and second electrode layers is not less than about 0.1 µm and not more than about 0.35 µm.

7. The surface mount electronic component according to claim 1, wherein the exterior material is made of a thermosetting epoxy resin.

8. The surface mount electronic component according to claim 1, wherein the element has a disk shape;

a diameter of an outer shape of the element is not less than about 3.4 mm and not more than about 5.0 mm; and a thickness t of the element is not less than about 0.90 mm and not more than about 0.95 mm.

9. The surface mount electronic component according to claim 1, wherein the element includes a single ceramic plate.

10. The surface mount electronic component according to claim 1, wherein the element is made of a dielectric ceramic primarily including at least one of $BaTiO_3$, $CaTiO_3$, $SrTiO_3$, and $CaZrO_3$.

11. The surface mount electronic component according to claim 1, wherein the element is a capacitor.

12. The surface mount electronic component according to claim 1, wherein the element has a disk shape;

a diameter of an outer shape of the element is not less than about 3.0 mm and not more than about 6.0 mm; and a thickness t of the element is not less than about 0.80 mm and not more than about 1.2 mm.

13. The surface mount electronic component according to claim 1, wherein each of the first and second external electrodes is made of at least one of Cu, Ni, Cr, Ag, Pd, Au, Ti, Ag—Pd alloy, Cu—Ni alloy, Cu—Ti alloy, Ni—Cr alloy, and Ni—Ti alloy.

14. The surface mount electronic component according to claim 1, wherein a thickness of each of the first and second external electrodes is not less than about 0.7 µm and not more than about 1.2 µm.

15. The surface mount electronic component according to claim 1, wherein each of the first and second metal terminals includes a terminal body and a plating film provided on a surface of the terminal body.

16. The surface mount electronic component according to claim 15, wherein the terminal body is made of Ni, Fe, Cu, Ag, Cr, or an alloy primarily including one or more of Ni, Fe, Cu, Ag, and Cr.

17. The surface mount electronic component according to claim 15, wherein a thickness of the terminal body is not less than about 0.05 mm and not more than about 0.5 mm.

18. The surface mount electronic component according to claim 15, wherein the plating film includes a lower plating film provided on a surface of the terminal body and an upper plating film provided on a surface of the lower plating film.

19. The surface mount electronic component according to claim 18, wherein the lower layer plating film is made of Ni, Fe, Cu, Ag, Cr, or an alloy primarily including one or more of Ni, Fe, Cu, Ag, and Cr.

20. The surface mount electronic component according to claim 18, wherein the upper layer plating film is made of Sn, Ag, Au, or an alloy primarily including one or more of Sn, Ag, and Au.

* * * * *